United States Patent
King et al.

(10) Patent No.: US 9,442,620 B2
(45) Date of Patent: Sep. 13, 2016

(54) NAVIGATION SYSTEMS WITH EVENT NOTIFICATION

(75) Inventors: Nigel King, San Mateo, CA (US); Steven Miranda, Burlingame, CA (US); Rajesh Singh, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1731 days.

(21) Appl. No.: 11/842,600

(22) Filed: Aug. 21, 2007

(65) Prior Publication Data

US 2009/0055770 A1  Feb. 26, 2009

(51) Int. Cl.
*G06F 3/00* (2006.01)
*G06F 3/048* (2013.01)
*G06F 3/0481* (2013.01)
*G06Q 10/10* (2012.01)

(52) U.S. Cl.
CPC ............. *G06F 3/0481* (2013.01); *G06Q 10/10* (2013.01)

(58) Field of Classification Search
USPC ....... 715/700, 705, 733, 751, 764, 771, 783, 715/810, 825, 853–855, 907, 961, 965, 966, 715/969, 970
See application file for complete search history.

(56) References Cited

U.S. PATENT DOCUMENTS

| | | | | |
|---|---|---|---|---|
| 5,826,239 A * | 10/1998 | Du et al. | ...................... | 705/7.26 |
| 5,905,496 A * | 5/1999 | Lau et al. | ...................... | 715/835 |
| 6,038,555 A * | 3/2000 | Field | ........................ | G06N 3/02 706/15 |
| 6,065,009 A * | 5/2000 | Leymann et al. | | |
| 6,067,535 A * | 5/2000 | Hobson | ..................... | G06N 3/02 706/10 |
| 6,147,687 A * | 11/2000 | Wanderski | ............ | G06F 3/0481 707/999.201 |
| 6,437,812 B1 * | 8/2002 | Giles | ...................... | G06F 3/0481 715/853 |
| 6,496,209 B2 * | 12/2002 | Horii | .................... | G06F 11/0709 715/734 |
| 6,578,006 B1 * | 6/2003 | Saito | ...................... | G06Q 10/04 705/7.17 |
| 6,618,730 B1 * | 9/2003 | Poulter et al. | ................ | 705/7.27 |
| 6,725,445 B1 * | 4/2004 | Leymann | ................ | G06F 9/542 700/101 |
| 6,738,933 B2 * | 5/2004 | Fraenkel | ............. | G06F 11/3006 702/186 |
| 6,763,353 B2 * | 7/2004 | Li et al. | ......................... | 719/320 |
| 6,765,597 B2 * | 7/2004 | Barksdale | ......... | G06F 17/30126 707/E17.012 |
| 6,775,658 B1 * | 8/2004 | Zothner | .......................... | 706/47 |
| 6,854,088 B2 * | 2/2005 | Massengale et al. | ......... | 715/764 |
| 6,931,392 B1 * | 8/2005 | Skeen | | |
| 7,062,749 B2 | 6/2006 | Cyr et al. | | |

(Continued)

FOREIGN PATENT DOCUMENTS

WO   WO01/27762 A1 *   4/2001

OTHER PUBLICATIONS

Hans Bergsten, JavaServer Pages, Dec. 1, 2000, 17 pages.*

(Continued)

*Primary Examiner* — Yongjia Pan
(74) *Attorney, Agent, or Firm* — Precision IP

(57) ABSTRACT

This disclosure describes tools for navigating within applications, and in particular business applications. For example, a menu system may incorporate a notification system, such that notifications of events received at a business application are displayed within the context of the menu system. The user can be allowed to select an event from the menu system, allowing the user to quickly navigate to a context, within the application, corresponding to the event.

37 Claims, 5 Drawing Sheets

(56) References Cited

U.S. PATENT DOCUMENTS

| | | | |
|---|---|---|---|
| 7,079,010 B2* | 7/2006 | Champlin | G06F 11/3495 340/286.02 |
| 7,340,679 B2* | 3/2008 | Botscheck et al. | 715/738 |
| 7,389,447 B2* | 6/2008 | Norman | H04N 7/165 348/E17.003 |
| 7,472,388 B2* | 12/2008 | Fukunari | G06F 11/0715 700/17 |
| 7,603,674 B2 | 10/2009 | Cyr et al. | |
| 7,630,955 B2* | 12/2009 | Byrd et al. | |
| 7,711,694 B2* | 5/2010 | Moore | G06Q 10/06316 705/7.26 |
| 7,739,135 B2* | 6/2010 | Shukla | G06Q 10/0633 370/245 |
| 7,778,899 B2* | 8/2010 | Scumniotales | G06Q 10/10 705/35 |
| 7,921,368 B2* | 4/2011 | Moody et al. | 715/751 |
| 8,060,396 B1* | 11/2011 | Bessler et al. | 705/7.23 |
| 8,082,292 B2* | 12/2011 | Karmakar et al. | 709/202 |
| 8,090,776 B2* | 1/2012 | Torres et al. | 709/206 |
| 8,214,737 B2* | 7/2012 | Botscheck et al. | 715/709 |
| 8,219,917 B2* | 7/2012 | Black-Ziegelbein | G06F 11/324 715/711 |
| 8,271,882 B2* | 9/2012 | Botscheck et al. | 715/738 |
| 8,332,502 B1* | 12/2012 | Neuhaus et al. | 709/224 |
| 8,402,384 B2* | 3/2013 | Scott | G06F 3/0481 715/779 |
| 8,417,682 B2* | 4/2013 | Wilcox | G06Q 10/06 707/705 |
| 8,583,514 B2* | 11/2013 | Klem | G06Q 10/06 705/22 |
| 2001/0044738 A1* | 11/2001 | Elkin et al. | 705/8 |
| 2002/0116362 A1* | 8/2002 | Li et al. | 707/1 |
| 2002/0154177 A1* | 10/2002 | Barksdale | G06F 17/30126 715/853 |
| 2002/0157017 A1* | 10/2002 | Mi et al. | 713/200 |
| 2002/0186238 A1* | 12/2002 | Sylor | H04L 41/22 714/736 |
| 2002/0186261 A1* | 12/2002 | Giles | G06F 3/0481 715/853 |
| 2003/0028823 A1* | 2/2003 | Kallela | G05B 23/0278 714/26 |
| 2003/0046134 A1* | 3/2003 | Frolick | G06Q 10/063118 705/7.17 |
| 2003/0061266 A1* | 3/2003 | Ouchi | 709/106 |
| 2003/0174162 A1* | 9/2003 | Wu | 345/736 |
| 2003/0200293 A1* | 10/2003 | Fearn et al. | 709/223 |
| 2004/0002958 A1* | 1/2004 | Seshadri et al. | 707/3 |
| 2004/0122853 A1* | 6/2004 | Moore | G06Q 10/06316 |
| 2004/0181775 A1* | 9/2004 | Anonsen et al. | 717/104 |
| 2004/0186860 A1* | 9/2004 | Lee | G06F 9/542 |
| 2004/0243422 A1* | 12/2004 | Weber et al. | 705/1 |
| 2004/0260582 A1* | 12/2004 | King | G06Q 10/06 705/7.27 |
| 2005/0049961 A1* | 3/2005 | Hansen | 705/38 |
| 2005/0198021 A1* | 9/2005 | Wilcox | G06Q 10/06 |
| 2005/0257158 A1* | 11/2005 | Lombardo | G06F 17/2288 715/751 |
| 2006/0009991 A1* | 1/2006 | Jeng et al. | 705/1 |
| 2006/0069605 A1* | 3/2006 | Hatoun | 705/9 |
| 2006/0070010 A1* | 3/2006 | Retlich | G06F 9/4443 715/798 |
| 2006/0143116 A1* | 6/2006 | Sumner et al. | 705/39 |
| 2006/0150155 A1* | 7/2006 | Blight et al. | 717/124 |
| 2006/0150156 A1 | 7/2006 | Cyr et al. | |
| 2006/0167704 A1* | 7/2006 | Nicholls et al. | 705/1 |
| 2007/0027909 A1* | 2/2007 | Moore | 707/103 R |
| 2007/0028188 A1* | 2/2007 | Black-Ziegelbein | G06F 11/324 715/853 |
| 2007/0150835 A1* | 6/2007 | Muller | G06F 3/0481 715/810 |
| 2007/0162324 A1* | 7/2007 | Suzuki et al. | 705/9 |
| 2008/0178092 A1* | 7/2008 | Schmidt et al. | 715/736 |
| 2008/0222531 A1* | 9/2008 | Davidson et al. | 715/736 |
| 2008/0255891 A1* | 10/2008 | Stone | 705/7 |
| 2008/0270948 A1* | 10/2008 | Lazzaro et al. | 715/854 |
| 2008/0281665 A1* | 11/2008 | Opaluch | 705/9 |
| 2008/0312986 A1* | 12/2008 | Braun et al. | 705/7 |
| 2010/0241972 A1* | 9/2010 | Spataro et al. | 715/753 |

OTHER PUBLICATIONS

Roberto Fresco and Andrea Pederiva, An Approach to the Process Maps Based on Semantic Web Methodologies, 2003, 11 pages.*

Steven Chan, In-Depth: Using Portal 10g with the E-Business Suite, May 9, 2006, 5 pages.*

* cited by examiner

NAVIGATION SYSTEMS WITH EVENT NOTIFICATION

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates generally to computer software applications, and in particular to tools for navigating among software applications.

BACKGROUND

As software applications provide increased functionality, they generally increase in complexity correspondingly. As a result, much work has been done on providing tools for efficiently navigating amongst the various features provided by applications, such as, for example, desktop applications and business applications. Such "business applications" (or, as they are sometimes called, "enterprise applications") can include, without limitation, customer relations management ("CRM") applications, enterprise resource planning ("ERP") applications, supply chain management applications, and other applications dealing with various finance, accounting, manufacturing, and/or distribution functions, to name but a few examples. Exemplary enterprise application suites include, without limitation, the Oracle eBusiness Suite and JD Edwards Enterprise One, both of which are available from Oracle Corp.

One common tool used for navigating in an application is a menu system. In some cases, menu systems may be provided by the "chrome" of a desktop application (and/or a desktop client of a business application). In other cases, a business application may be provided through a Web interface (e.g., as a series of web pages served from a web server and/or application server to a Web browser on a client computer), and/or menu systems may be implemented within the web pages of the business application. Merely by way of example, U.S. patent application Ser. No. 11/742,043, filed Apr. 30, 2007 by Adrien Lazzaro et al. and entitled "Suite-Wide Navigation," the entire disclosure of which is incorporated herein by reference, describes various navigation systems that can be employed by business applications.

Another common tool is a notification system, which can be used to notify a user of events occurring within (or outside of) an application that may be of interest to the user. As an example, many Internet-enabled applications include notification systems to notify their users of new content (e.g., podcasts, RSS feeds, and/or the like). Notification systems are useful because they can convey relatively urgent information in an expeditious manner.

Many applications employ a variety of navigation tools including, without limitation, menu systems and/or notification systems, but fail to provide any sort of user interface integration between the tools. For example, if an alert is received in a notification system, the user might have to navigate (e.g., using a navigation system) to a function associated with that alert.

Accordingly, there is a need in the art for more robust navigation systems within applications.

BRIEF SUMMARY

Embodiments of the invention provide improved tools for navigating within applications, and in particular business applications. In one set of embodiments, for example, a menu system may incorporate a notification system, such that notifications received at a business application are displayed within the context of the many system. Beneficially, this allows the user to quickly see notifications, but also to quickly navigate to a function associated with a particular notification. Embodiments of the invention, therefore, can be used both to maximize the information provided to the user and minimize the amount of user effort necessary to take action with respect to the information.

The tools provided by various embodiments invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like). In a particular embodiment, the set of instructions might be incorporated within a business application.

An exemplary computer system according to one set of embodiments might comprise one or more processors and an application configured to be executable by the one or more processors. In some cases, the application might be a business application. In an aspect, the business application might be stored on a computer readable medium that is in communication with the one or more processors. According to one embodiment, the business application comprises a navigation system, which includes a menu.

The navigation system might be configured to receive notification of an event an/or identify a function of the business application to which the event pertains. In some cases, the navigation system is further configured to identify a menu item corresponding to the identified function and/or to display the menu for the user. In an aspect, the displayed menu might comprise the identified menu item. In another aspect, the display of the menu item might provide an indication of the event. The navigation system, then, might be configured to receive, from the user, a selection of the event and/or to navigate, in response to the selection, to a context within the business application corresponding to the event.

An exemplary method of navigation within a computer system might comprise receiving, at a business application executing on the computer system, notification of a set of one or more events and/or identifying, at the computer system, a function of the business application to which the set of one or more events pertain. The method, in some cases, further comprises identifying a menu item corresponding to the identified function and/or modifying a display property of the menu item. This can provide an indication of the set of one or more events. In one aspect, modifying a display property of the menu item comprises providing an interface element to allow the user to view additional information about the set of one or more events.

In some embodiments, the method might also comprise displaying the menu, including the menu item and the interface element, for the user and/or receiving input, from the user, through the interface element. In response to the input received from the user, a list of the one or more events might be displayed for a user, and, in some cases, the method comprises receiving, from the user, a selection of an event from the set of one or more events. In response to the selection, the method might comprise navigating to a context within the business application corresponding to the selected event.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

Figure 1A:
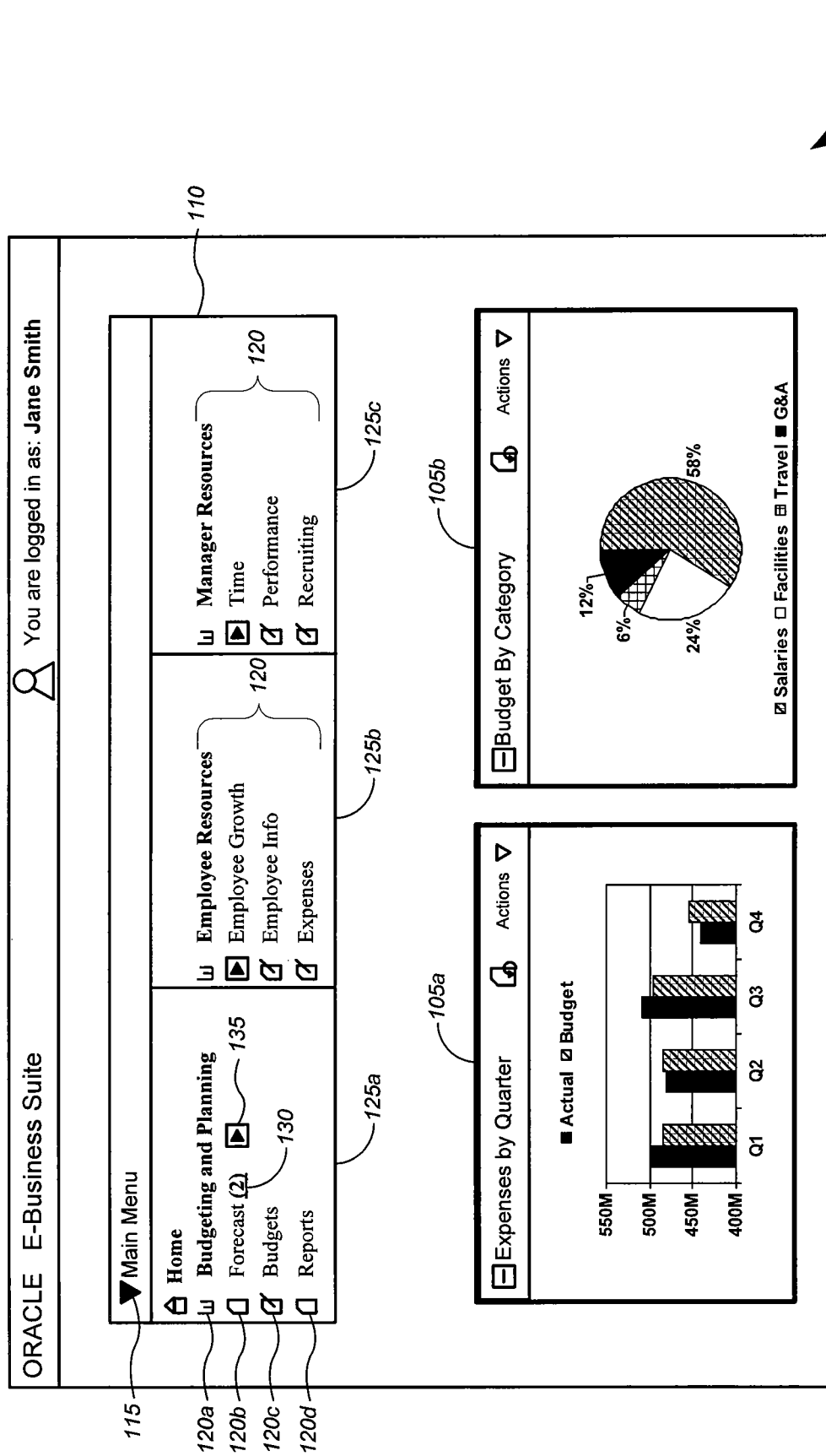
FIGS. 1A and 1B illustrate exemplary screen displays of applications employing navigation tools in accordance with various embodiments of the invention.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiments as well. By the same token, however, no single feature or features of any described embodiment should be considered essential to the invention, as other embodiments of the invention may omit such features.

In general, embodiments of the invention provide improved tools for navigating within applications, and in particular business applications. In one set of embodiments, for example, a menu system may incorporate a notification system, such that notifications received at a business application are displayed within the context of the menu system. Beneficially, this allows the user to quickly see notifications, but also to quickly navigate to a function associated with a particular notification. Embodiments of the invention, therefore, can be used both to maximize the information provided to the user and minimize the amount of user effort necessary to take action with respect to the information.

The term "event" is used broadly herein to describe any type of occurrence and/or condition that might be of interest to a user, such that some sort of indication of the occurrence/ condition possibly should be provided to the user. The term "notification" is used broadly herein to describe how a menuing system is informed of the occurrence of an event— in some cases, the notification may be explicit (e.g., transmission of a message, etc.), while in others it may be implicit (such as by operation of a query to find conditions that meet a particular criteria).

In some cases, an event might be an explicit event (such as the completion of a workflow task, the addition of data to a database, etc.) within the business application. Merely by way of example, many applications (including, in particular, business applications) employ workflow processing, in which a series of tasks are performed by different users, perhaps in some predetermined order. In a typical case, a user might be notified by a business application when a workflow process has reached the stage at which input from that user is necessary. In accordance with an embodiment of the invention, such a notification may be provided within a menu system for the business application; in a particular aspect, a notification is provided using a menu item that corresponds to a function to which the notification relates. Thus, for example, if the business application might receive an indication that a proposed budget has been prepared by another user, and the notification might be displayed as part of a "review budget" menu item. Merely by way of example, the "review budget" menu item might be highlighted in some fashion (e.g., a varying typeface, font style, color, size, etc.), and/or some other indication may be provided, that an event has occurred that relates to the "review budget" menu item. By selecting this menu item, the user may cause the business application to navigate to context associated with the menu item (and or, by implication, the event). In other cases, another user interface element may be provided to allow such navigation without selection of the menu item itself.

In other cases, an event might be implicit, such as the occurrence of a condition meeting some criteria. The occurrence of such a condition might trigger an explicit event within the application; alternatively, the event might be implicit merely in the occurrence of the condition. Merely by way of example, a criterion might be an early payment discount deadline, and the fact that a supplier invoice is nearing the time at which early payment discount will be lost may be a condition meeting such a criterion. In such circumstances, it may be appropriate for an accounts payable manager to be notified of the condition. Hence, a notification that an invoice meets this condition (and/or the count of invoices that meet that condition) might be rendered in a menu system. Optionally, the menu might also provide a name for the criteria resulting in the notified condition, which could be used to allow a user search (e.g., within a business application and/or an associated database) for such invoices.

FIG. 1A illustrates an exemplary screen display 100 of an application employing a menu system in accordance with one set of embodiments. Depending on the embodiment, the screen display 100 might be created by any of a number of different types of applications. Merely by way of example, in some embodiments the screen display 100 might be created by a standalone application on a client computer and displayed for a user of the client computer. In other embodiments, the screen display 100 might be created by a client application in a client/server environment, based on data obtained from a server application. In yet other embodiments, the screen display 100 might be displayed by a Web browser, based on information received from a web server (which might be incorporated within, comprise, and/or operate in conjunction with an application server) that generates and/or serves web pages created by a business application. Other possibilities will be apparent to those skilled in the art, based on the disclosure herein.

In the illustrated embodiment, the screen display 100 has been created by a business application, and it includes a plurality of application interface components 105, which display information generated by various components of the business application. The screen display 100 also comprises a menu 110. In some cases, the menu 110 can be invoked dynamically in a Web browser (using any of a variety of available technologies, such as JavaScript, Ajax, and or the like), for instance by using an interface element 115, which might be a button, a hyperlink, and/or the like. Hence, in an aspect, the menu 110 might be had in the until invoked by selecting the interface element 115, at which point the menu 110 is displayed. (In another aspect, the user might be able to select the interface element of 115 a second time to cause the menu 110 to be hidden again.)

In the illustrated embodiment, the menu comprises a plurality of menu items 120, which may be (but need not be) divided into one or more menu columns 125, perhaps according to functional relationships between a menu items, and/or the like. (Merely by way of example, U.S. patent application Ser. No. 11/742,043, already incorporated by reference, describes tools for organizing menu items and menu columns, many of which can be implemented within various embodiments of the present invention.)

In the illustrated embodiment, the Forecast menu item 120b includes an indicator 130 that provides notification to the user that an event has been identified pertaining to the menu item 120b. In the illustrated embodiment, the indicator 130 comprises an identifier indicating the number of events identified that are associated with a function corresponding to the menu item 120b. In the illustrated embodiment, the menu 110 also comprises a user interface element 135 (which, in this case, is a button) that can be selected to display a list of events associated with the menu item 120b. Hence, in the illustrated embodiment, if a user wants to navigate to a context provided by one of the events, the user can first select the interface element 135 to invoke a display of a list of the events (and/or more precisely, a list of notifications or contexts), and select from that list. (In other embodiments, the user might be provided with a facility (such as an interface element) to link directly to the context of the events, without having to first display a list.)

Figure 1B:
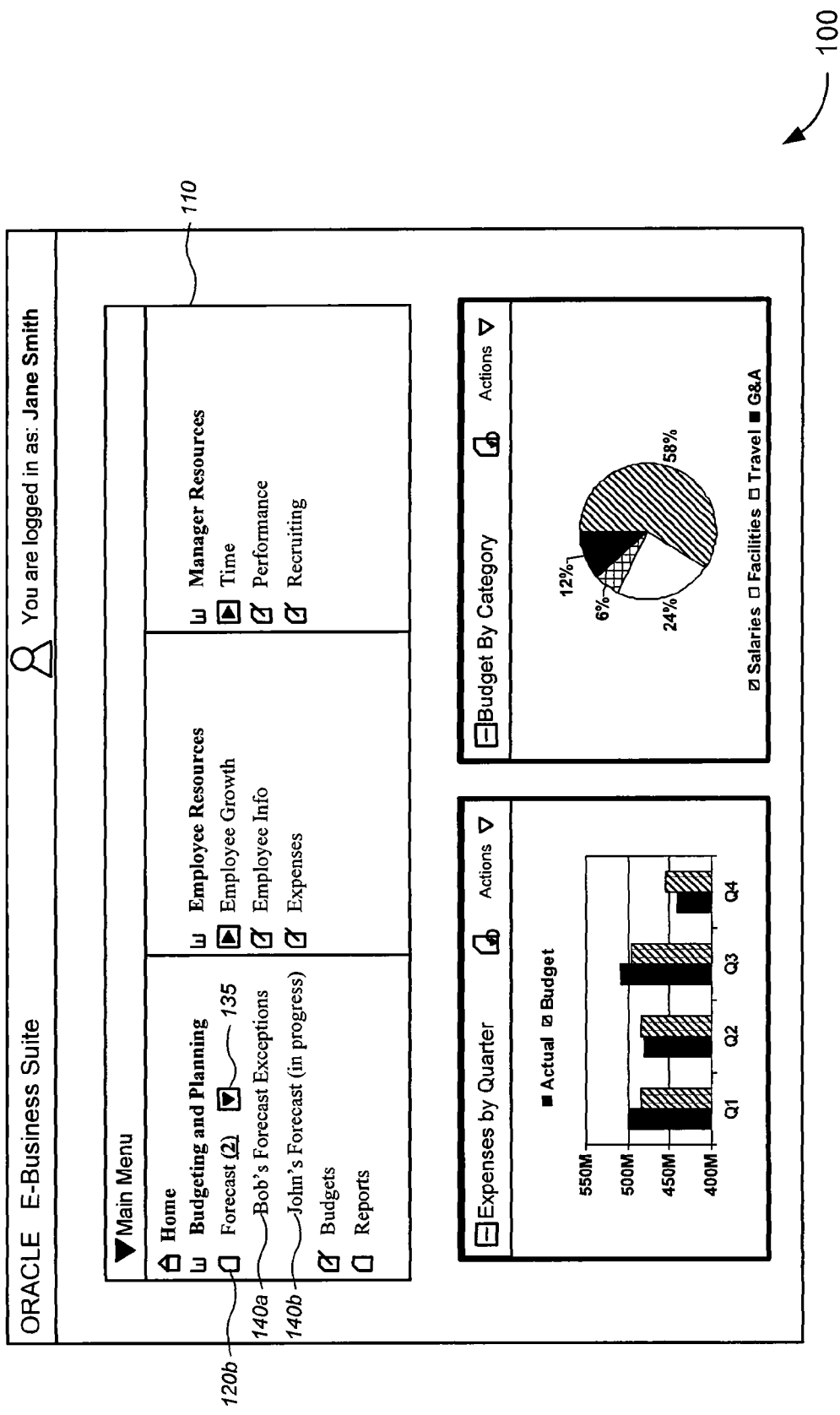

Merely by way of example, FIG. 1B illustrates the screen display 100 after the user has selected the interface element 135. Specifically, the menu has been expanded to display a list of two events 140 related to the menu item 120b. In a set of embodiments, each of the event notifications 140 is selectable (e.g., it the screen display 100 is presented in a Web browser, each of the event notifications 140 might be implemented as a hyperlink which can be selected) to navigate to a context in the business application associated with that particular event. For instance, by selecting event notification 140a, the user can cause the application to navigate to a page created by a forecast component of the business application, which displays the forecast exceptions created by another user (Bob).

Figure 2:
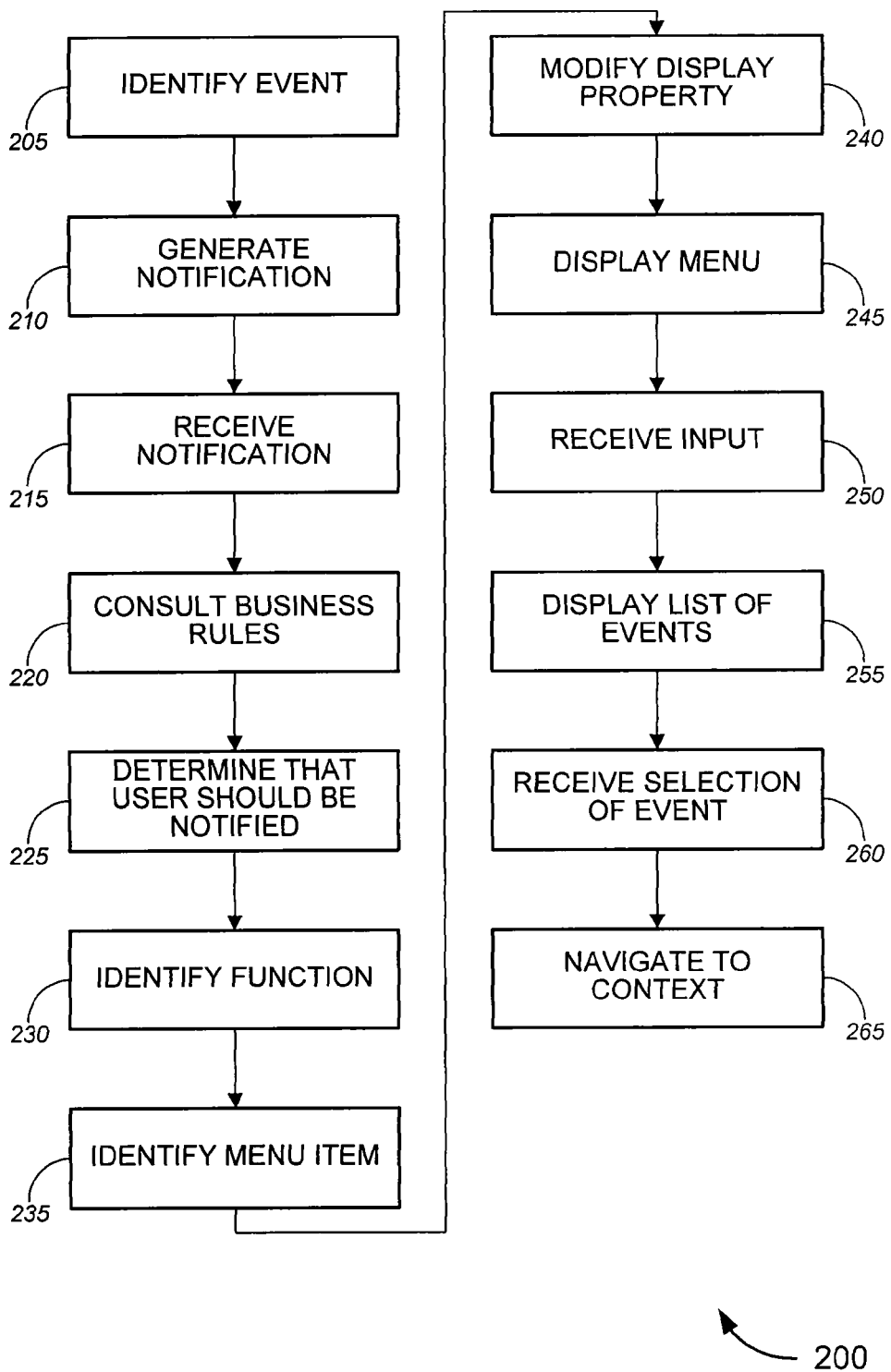
FIG. 2 is a process flow diagram illustrating a method of providing navigation in an application, in accordance with various embodiments of the invention.

FIG. 2 illustrates a method 200 of providing navigation in accordance with one set of embodiments. For illustrative purposes, the method 200 is described with respect to a business application, but it should be appreciated that embodiments of the invention can be implemented within many different types of applications, and that the invention is not limited to any particular type of application, software arrangement, or hardware architecture.

At block 205, the method 200 comprises identifying an event. As noted above, the event might be an explicit event triggered by the application, while in other cases, an event might be the satisfaction of a condition meeting a particular criterion or set of criteria. In some instances, the event may be generated and/or identified by the application itself, while in others, the event may be generated and/or identified outside the application. As noted above, there are a wide variety of events that may be accommodated by embodiments of the invention. Merely by way of example, one type of event might be a change in data stored in a database associated with a business application. The change might be the addition of new data (which might be, but need not be, generated and/or used by the business application, the deletion of data, and/or the modification of data that already exists in the database. Merely by way of example, if one or more records in a database are added, modified, or deleted, any of these actions might trigger an event in the database. In some, but not all, cases, the data might be associated with a key performance indicator. Another type of event might simply be the passage of time (such as a deadline, the expiration of a timer, etc.).

In an aspect, an application, such as a business application to name but one example, might support workflows comprising multiple tasks to be performed by multiple entities (which can include users, automated processes, etc.), and one type of event might be the completion of one of the tasks in a workflow by another entity (such as another user, an automated process, and/or the like.) For instance, the completion of one task by another user might mean that the current user now needs to perform another task, and the navigation tools of the invention can be used to notify the current user that there is a task awaiting completion by that user.

Some events might be global (i.e., applicable to all users of an application, while other events might be specific to a particular user and/or group of users (e.g., based on user roles assigned by the application, and/or the like). In some cases, business rules are used to determine the criteria for an event and/or the users to which the event applies. Merely by way of example, a business rule might specify, for a particular set of data (e.g., a particular record or field, or group of records or fields), that a value above, or below a particular threshold value should be considered an event. The business rule (and/or another business rule) might additionally specify that the event applies to a particular user.

As used herein, the term "business rule" means any rule, algorithm and/or logic that is used to govern the operation of an application (and/or some specific functionality within the application). In many cases, a business rule represents, within the application, an operational principle and/or characteristic of the operations of an organization that an application (specifically, in many cases, a business application) is designed to track, model and/or control. Merely by way of example, as described in further detail below, a business rule might define a key performance indicator for an organization (i.e., a metric, which may be, but need not be financial in nature, that quantifies a business objective of the organization to indicate the performance of the organization in some specific area) and/or identify criteria in which a key performance indicator might be used to trigger an event.

It should be noted that, while several types of events our described herein, embodiments of the invention do not depend on the type of event, or how (or even whether) it is generated. Hence there are a wide variety of events they may be implemented in accordance with various embodiments invention, depending on, inter alia, the type of application in which the navigation tools of the invention are implemented.

Upon identification of an event, a notification is generated (block 210). In some cases, the notification may be generated by the application, while in other cases, the notification may be generated outside the application. In a particular set of embodiments, the application will generate a notification of an event upon identifying the event. In a set of embodiments the notification is provided to a navigation system operated by the application and or on behalf of the application.

At block 215, the application receives a notification of the event(s). (As used herein, when a notification of an event is described as being "received by the application," the use of that term does not necessarily mean that the event is generated outside of the application; rather, the event may be generated within the application, in which case, the application may effectively "notify" itself of the occurrence of the event. Hence, the term "received by the application" is used in a broad sense to mean merely that an event, and/or notification of an event is identified, acknowledged, recorded, or otherwise noted by the application.) In a particular embodiment, the notification of the event identifies the event in some fashion, for example, by providing a reference (such as a link) to the data, etc. associated with the event and/or by providing some textual or graphical description (or a reference to such a description) that can be used to identify the event to a user. Hence, in some, but not all, cases, the notification might be directed to a particular user of the application.

In some cases, upon receiving notification of the event(s), the application (or more particularly in some cases, the navigation system) consults a set of business rules (block 220) in order to determine whether the event is the type of event about which the current user of the application should be notified. (These business rules may be, but need not be, the same business rules that are used to identify the event itself.) One skilled in the art will understand that there may be many concurrent users of a business application. In the current context, however, it is assumed that the navigation system is operating in regard to a current, known user (e.g., a user that is identified by login credentials and/or the like) of the business application. Merely by way of example, if the event pertains to a change of data that is used to calculate the key performance indicator, a business rule may be used to determine that the key performance indicator is (or should be) of interest to the user, such that the user should be notified about the change of data. Based on the disclosure herein, one skilled in the art will appreciate that a wide variety of business rules can be used in this context, depending on the type of events that are generated and/or the business needs of the user and/or the user's organization.

In some cases, the business rules governing the indication of events in a menu might be specific to the menu system. In other cases, however, a business rule governing the general operation of the application might be applied within the context of the navigation tools of the invention. Merely by way of example, in a set of embodiments, a business rule might define a key performance indicator for the application generally, and the business rule might further provide that an event is to be generated if a value of the key performance indicator changes.

Based, perhaps, on these business rules (and/or other logic of the business application), it may be determined that the user should be notified of the identified event (block 225). (In other cases, for example, if the notification is directed to a particular user, the navigation system might not need to consult any rules to determine whether the user should be notified of the event.) If it is determined that the user should be notified (whether by consulting business rules or not), a function of the application corresponding to the event is identified (block 230). Merely by way of example, returning to the example of FIGS. 1A and 1B, if the event is the updating of a forecast, a business rule might determine that the event relates to a forecasting function (and/or component) of the business application. The business rules (and/or other logic within the application) may also be used to identify a menu item corresponding to that function may be identified (block 235). Again referring to the example of FIGS. 1A and 1B, the application (and/or, more specifically in some cases, the navigation system of the application), after (and/or as a part of) determining that the event corresponds to the forecasting function, will identify the "Forecast" menu item 120b as the menu item to which the event corresponds.

At block 240, a display property of the identified menu item may be modified to provide an indication of the event. (As illustrated by FIGS. 1A and 1B, this process may be used for a plurality of events.) Merely by way of example, the text of the menu item may be modified to indicate that an event has been identified corresponding to that menu item. Alternatively and/or additionally, an identifier (such as the identifier 130 described above, to name but one example) may be added to the menu item to indicate the existence of an event (and, optionally, how many events) associated with the identified menu item. In other embodiments, the typeface, font, size command or the like of the text of the menu item might be modified and/or the menu item might be highlighted in some other fashion to provide notification to the user of an event. In a particular set of embodiments, modifying a display property of the menu item might comprise providing an interface element (such as a button, hyperlink, etc.) to allow the user to view additional information about the event(s). Merely by way of example, as illustrated by FIGS. 1A and 1B, there might be a button, etc. that can be selected by the user to invoke a list of events, such that each entry in the list provides a brief textual description of an event.

In some cases, events might have different levels of urgency, in which case, the type of modification of the menu item might depend on the urgency level. Merely by way of example, if an event is considered urgent (e.g., based on a determination made by consultation of one or more business rules), the menu item might be modified in a different fashion (e.g., by changing the menu item's text color to red, by adding a special graphical identifier to the menu item, etc.) than menu items corresponding to less urgent events.

At block 245, the menu is displayed (e.g., by the application, by a navigation system in the application, as part of a web page generated by the application, etc.). The displayed menu includes the menu item associated with the event(s), as well as any interface element provided by the navigation system in conjunction with the events. In a particular set of embodiments, for example, displaying the menu might comprise displaying a menu similar to menu 100 and illustrated by FIGS. 1A and 1B, and described above. Thus, for example, the menu might include a facility (such as an interface element, etc.) to allow the user to provide input for selecting events, for invoking a display of a list of events, and/or the like.

As noted above, the way in which the menu is displayed generally will depend on the nature of the application. Merely by way of example, as described above, if the menu is provided in a web page, displaying the menu might comprise generating a web page that includes the menu, transmitting web page (e.g., via a web server, which might be in communication with and/or incorporated within the computer on which the application executes) to a client computer, and/or displaying the web page in a Web browser on the client computer. Also as noted above, displaying the menu might comprise providing an interface element (e.g., button, hyperlink, etc.) to allow the user to invoke the menu. In other contexts, however, the menu might be displayed in other ways. For instance, if the application is a standalone application running on a client computer (and/or the client component of a client/server application, etc.), the menu may be displayed using the chrome of the application and/or any other widgets or user interface elements available in the application, as known to those skilled in the art.

The method 200, then, might comprise receiving input via the menu (block 250), e.g. a selection of a user interface element then invokes the display of a list of the events, as described above for example, or any other pertinent information about the events. In an application running on a client computer, receiving the input might comprise receiving keyboard and/or mouse input directly at the application. In other cases (e.g., if the application is provided via a web interface), receiving the input might comprise receiving input from a web browser on the client computer (via a web server, for example).

In some cases, the received input might directly trigger navigation to a context in the application associated with the event, as described in further detail below. In other cases, however, the input might simply be used as a trigger to display information about the event(s). Hence, in response to the input, information about the events might be displayed. Merely by way of example, in a particular embodiments, in response to receiving the input, the application (and/or navigation system, etc.) displays a list of one or more events (block 255). The list might comprise, for example, a brief graphical and/or textual description of the event (such as the descriptions 140 illustrated on FIG. 1B, for example). In some cases, the list of events might be implemented as a "tree" view of menu items, and the response to the user input might be to expand the "tree" to provide a display of the list of events as menu items (e.g., as displayed in FIG. 1B, for example). Each entry in the list might comprise a hyperlink that can be selected by the user.

The user may select one of these events, e.g., by selecting a hypertext link corresponding to a description of an event and/or an entry in a list of events, by selecting another interface element associated with the event, and/or the like. Upon receiving the selection of the event (block 260), either directly at the application from the user and/or from a web browser via a web server (depending on the implementation of the application), the application may navigate to the context within the application corresponding to the event (block 265). Merely by way of example, if the application is provided in a web browser, navigating to the event might comprise generating, transmitting (e.g., via a web server) and/or displaying a web page corresponding to the event and/or the function with which the event is associated. In other cases, navigating to the event might comprise displaying a window corresponding to the function and/or the event, invoking another application and/or application component with which the event is associated, and/or the like.

As noted above, one type of event might be the completion of a prerequisite task in a workflow process, indicating that the application is waiting for the user to complete another task in the workflow. If the event is associated with a workflow, the application might navigate to a screen corresponding to a task to be performed by the user in relation to that workflow.

The procedures described above with respect to FIG. 2 can be used with regard to one or more events that all correspond to a particular function of the application and/or menu item. Further, in accordance with some embodiments, these procedures can be used with regard to two or more events that correspond to different functions and/or menu items. In an aspect, the method 200 (and/or portions thereof) can be performed iteratively for multiple events. In another aspect, the method 200 might be performed once for a plurality of events (perhaps with certain individual procedures, such as identifying an event, receiving notification of an event, etc.) being performed iteratively for each event. Merely by way of example, if the receipt of a first event results in the modification of a first menu item, receipt of a second event might result in the modification of a second menu item and/or further modification of the first menu item, depending on whether the second event corresponds to the first menu item or another menu item. Hence, it should be noted that embodiments of the invention support wide variations in how the particular procedures of the method 200 are implemented.

Figure 3:
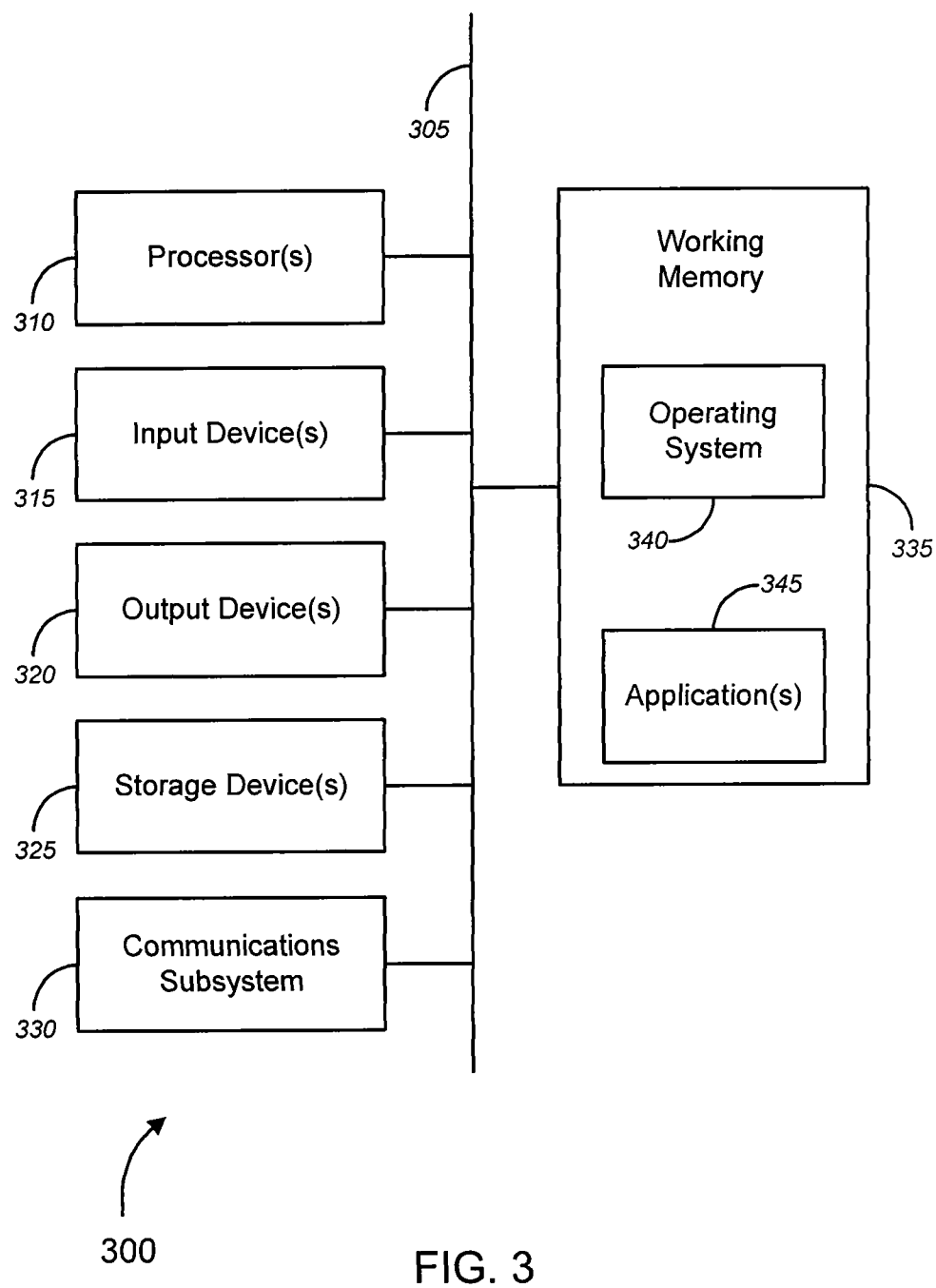
FIG. 3 is a generalized schematic diagram illustrating a computer system that may be employed by various embodiments of the invention.

FIG. 3 provides a schematic illustration of one embodiment of a computer system 300 that can perform the methods of the invention, as described herein, and/or can function as a server computer (e.g., an application server, web server and/or the like) and/or a client computer (e.g., a computer running a client application in a client/server environment, a computer running a standalone application, and/or the like). It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements can include one or more processors 310, including without limitation one or more general-purpose processors and/or one or more special-purpose processors (such as digital signal processing chips, graphics acceleration chips, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 300 might also include a communications subsystem 330; which can include without limitation a modem, a network card (wireless or wired), an infra-red communication device, and/or the like), a wireless communication device and/or chipset (such as a Bluetooth1M device, an 802.11 device, a WiFi device, a WiMax device, cellular communication facilities, etc.). The communications system 330 may permit data to be exchanged with a network (such as the network 410 described below, and/or any other devices described herein. In many embodiments, the computer system 300 will further comprise a working memory 335, which can include a RAM or ROM device, as described above.

The computer system 300 also can comprise software elements, shown as being currently located within the working memory 335, including an operating system 340 and/or other code, such as one or more application programs 345, which may comprise computer programs of the invention and/or may be designed to implement methods of the invention, as described herein. Merely by way of example, one or more procedures described with respect to the method(s) discussed above might be implemented as instructions executable by a computer (and/or a processor within a computer). A set of these instructions might be stored on a computer-readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), such that the storage medium can be used to program a generic computer with the instructions stored thereon. These instructions might take the form of executable code, which is executable by the computer system 300 and/or might take the form of installable code, which, upon installation on the computer system 300 (e.g., using any of a variety of generally available installation programs, compression/decompression utilities, etc.) then takes the form of executable code.

It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

In one aspect, the invention employs a computer system (such as the computer system 300) to perform methods of the invention. According to a set of embodiments embodiment, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another machine-readable medium, such as one or more of the storage device(s) 325. Merely by way of example, execution of the sequences of instructions contained in the working memory 335 causes the processor(s) 310 to perform one or more procedures of the methods described herein.

The term "machine-readable medium" as used herein refers to any medium that participates in providing data that causes a machine to operation in a specific fashion. In an embodiment implemented using the computer system 300, various machine-readable media might be involved in providing instructions to processor(s) 310 for execution. In many implementations, a machine-readable medium is a physical and/or tangible medium. Such a medium may take many forms, including but not limited to, non-volatile media, volatile media, and transmission media. Non-volatile media includes, for example, optical or magnetic disks, such as the storage device(s) 325. Volatile media includes, without limitation dynamic memory, such as the working memory 335. Transmission media includes coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves, including without limitation radio, acoustic and/or light waves, such as those generated during radio-wave and infra-red data communications.

Common forms of physical and/or tangible machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to the processor(s) 310 for execution. Merely by way of example, the instructions may initially be carried on a magnetic disk and/or optical disc of a remote computer. The remote computer might load the instructions into its dynamic memory and send the instructions as signals over a transmission medium. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
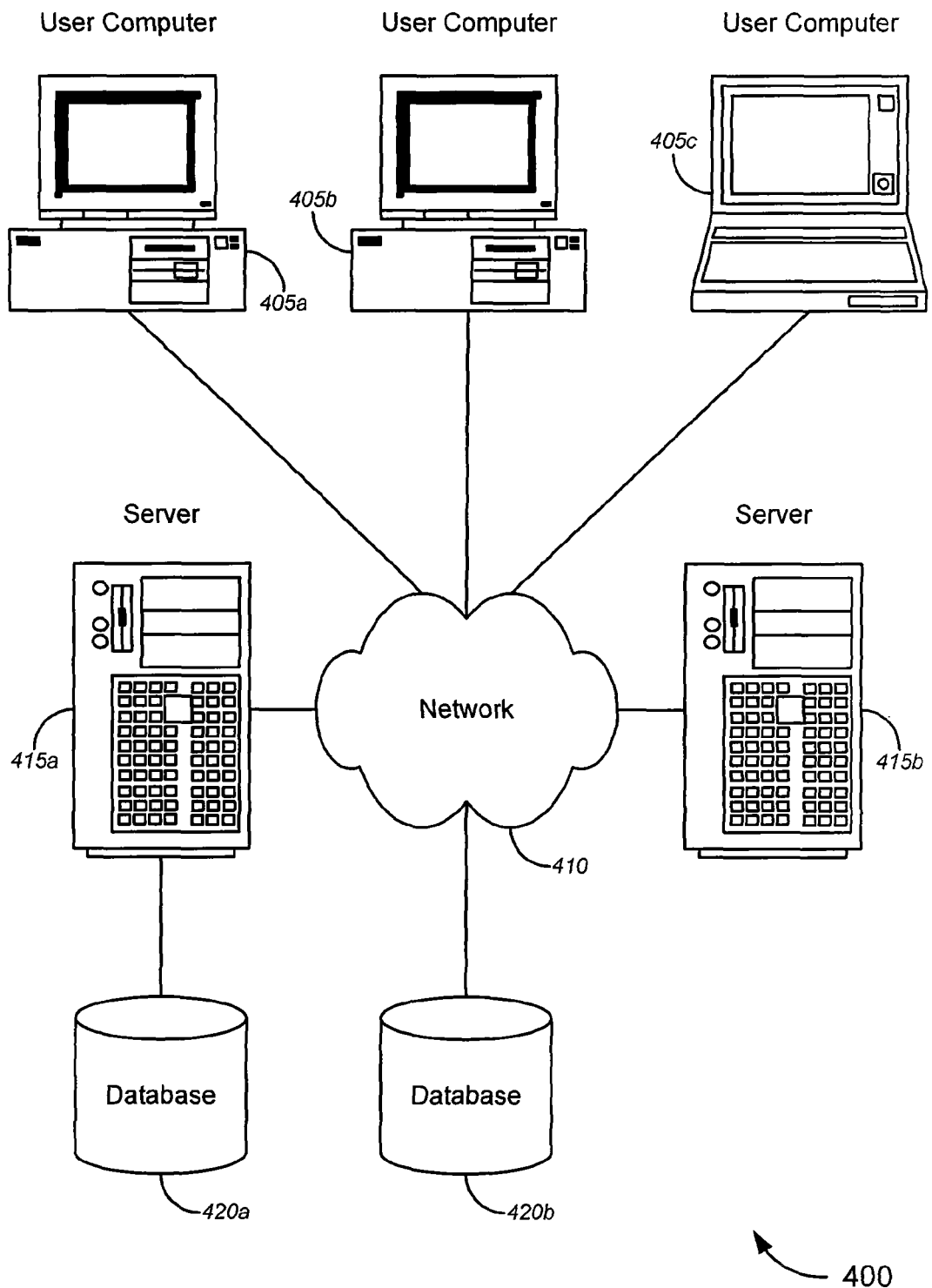
FIG. 4 is a block diagram illustrating the architecture of a networked system of computers that may be employed by various embodiments of the invention.

As noted above, one set of embodiments comprises systems for providing navigation in an application. Merely by way of example, FIG. 4 illustrates a schematic diagram of a system 400 that can be used in accordance with one set of embodiments. The system 400 can include one or more user computers 405 (also referred to herein as "client computers"). The user computers 405 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 405 can also have any of a variety of applications, including one or more applications configured to perform methods of the invention, as well as one or more office applications, database client and/or server applications, and web browser applications. Alternatively, the user computers 405 can be any other electronic device, such as a thin-client computer, Internet-enabled mobile telephone, and/or personal digital assistant, capable of communicating via a network (e.g., the network 410 described below) and/or displaying and navigating web pages or other types of electronic documents. Although the exemplary system 400 is shown with three user computers, any number of user computers can be supported.

Certain embodiments of the invention operate in a networked environment, which can include a network 410 (e.g., to provide navigation in client/server systems, to provide navigation in applications provided via a web browser, etc.). The network 410 can be any type of network familiar to those skilled in the art that can support data communications using any of a variety of commercially-available protocols, including without limitation TCP/IP, SNA, IPX, AppleTalk, and the like. Merely by way of example, the network 410 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 415. Each of the server computers 415 may be configured with an operating system including without limitation any of those discussed above, as well as any commercially-available server operating systems. Each of the servers 415 may also be running one or more applications, which can be configured to provide services to one or more clients 405 and/or other servers 415.

Merely by way of example, one of the servers 415 may be a web server, which can be used, merely by way of example, to process requests for web pages or other electronic documents from user computers 405. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 405 to perform methods of the invention.

The server computers 415, in some embodiments, might include one or more file and or/application servers, which can include one or more applications accessible by a client running on one or more of the client computers 405 and/or other servers 415. Merely by way of example, the server(s) 415 can be one or more general purpose computers capable of executing programs or scripts in response to the user computers 405 and/or other servers 415, including without limitation web applications (which might, in some cases, be configured to perform methods of the invention). Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on a user computer 405 and/or another server 415. In some embodiments, an application server can create web pages dynamically for displaying the information in accordance with embodiments of the invention, such as a web page comprising a menu created by a navigation system, a web page generated by a business application, etc. Data provided by an application server may be formatted as web pages (comprising HTML, Javascript, etc., for example) and/or may be forwarded to a user computer 405 via a web server (as described above, for example). Similarly, a web server might receive web page requests and/or input data from a user computer 405 and/or forward the web page requests and/or input data to an application server.

In accordance with further embodiments, one or more servers 415 can function as a file server and/or can include one or more of the files necessary to implement methods of the invention incorporated by an application running on a user computer 405 and/or another server 415. Alternatively, as those skilled in the art will appreciate, a file server can include all necessary files, allowing such an application to be invoked remotely by a user computer 405 and/or server 415. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420, some of which might store data used and/or generated by a business application, as described above. The location of the database(s) 420 is discretionary: merely by way of example, a database 420a might reside on a storage medium local to (and/or resident in) a server 415a (and/or a user computer 405). Alternatively, a database 420b can be remote from any or all of the computers 405, 415, so long as it can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 420 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method comprising:
receiving, at a computer system hosting a business application, information providing notification of a set of one or more events;
identifying, at the computer system, a menu item of a menu to which the set of one or more events pertain, the menu item corresponding to a function of the business application;
determining that a user should be notified of the set of one or more events based at least in part on consulting a set of business rules that comprises a first set of one or more business rules that specify notification based at least in part on a change in value of a key performance indicator, wherein at least one of the set of one or more events pertains to the key performance indicator;
in response to the determining, modifying a visual appearance of the menu item within the menu to provide an indication of receiving the set of one or more events based at least in part on a level of urgency associated with the set of one or more events, wherein the modifying comprises using an element that displays the set of one or more events;
modifying a menu hierarchy of the menu item of the menu to include another menu item in the menu hierarchy for each event in the set of one or more events;
receiving at the computer system, input from the user of the business application, indicative of a selection of an event from the set of one or more events displayed in the modified menu hierarchy; and
navigating, in response to the selection, to a context within the business application corresponding to the selected event.

2. The method of claim 1, wherein the notification is directed to the user.

3. The method of claim 1, wherein the set of one or more events comprises multiple events.

4. The method of claim 1, wherein modifying the visual appearance of the menu item within then menu comprises providing, in the menu, an indication of a number of events for which notification was received.

5. The method of claim 1, wherein at least one of the set of one or more events is generated by the business application.

6. The method of claim 1, wherein the business application supports a workflow comprising a plurality of tasks, and wherein at least one of the set of one or more events comprises completion, by a second user, of one of the plurality of tasks.

7. The method of claim 6, wherein the function corresponds to the workflow, and wherein navigating to a context within the business application comprises navigating to a screen corresponding to a second of the plurality of tasks in the workflow.

8. The method of claim 1, wherein at least one of the set of one or more events comprises modification of a set of data in a database maintained by the business application.

9. The method of claim 1, wherein at least one of the set of one or more events corresponds to a timer within the business application.

10. The method of claim 1, wherein the element is operable to expand a tree view comprising the menu hierarchy with the set of one or more events.

11. The method of claim 10, wherein the tree view comprises a set of one or more hyperlinks corresponding to the set of one or more events.

12. The method of claim 11, wherein receiving a selection of an event comprises the user selecting one of the one or more hyperlinks.

13. The method of claim 1, wherein the menu is displayed on a web page.

14. The method of claim 1, further comprising:
receiving, at the business application, notification of a second set of one or more events;
identifying, at the computer system, a second function of the business application to which the second set of one or more events pertain;
identifying a second menu item corresponding to the second function; and
modifying a display property of the second menu item to provide an indication of the second set of one or more events.

15. The method of claim 1, wherein the determining that the user should be notified of the set of one or more events is upon receiving notification of a set of one or more events.

16. The method of claim 15, wherein the set of one or more business rules comprises a first business rule governing operation of the business application.

17. The method of claim 16, wherein the first business rule defines the key performance indicator.

18. The method of claim 17, wherein the at least one of the set of one or more events comprises the change in the value of the key performance indicator.

19. The method of claim 1, wherein modifying the visual appearance of the menu item comprises of at least one of:
modifying a font in which the menu item is displayed;
modifying a text color in which the menu item is displayed; and
adding a special graphical identifier along with the menu item displayed.

20. A non-transitory computer readable medium having stored thereon a computer program comprising a set of instructions executable by a computer system, the set of instructions comprising:
instructions for receiving information providing notification of a set of one or more events;
instructions for identifying a menu item of a menu to which the set of one or more events pertain, the menu item corresponding to a function of a business application;
instructions for determining that a user should be notified of the set of one or more events based at least in part on consulting a set of business rules that comprises a first set of one or more business rules that specify notification based at least in part on a change in value of a key performance indicator, wherein at least one of the set of one or more events pertains to the key performance indicator, and, in response to the determining, modifying a visual appearance of the menu item within in the menu based at least in part on a level of urgency associated with the set of one or more events, wherein the modifying comprises using an element that displays the set of one or more events;

instructions for modifying a menu hierarchy of the menu item of the menu to include another menu item in the menu hierarchy for each event in the set of one or more events;

instructions for receiving, input from the user of the business application, indicative of a selection of an event from the set of one or more events displayed in the modified menu hierarchy; and instructions for navigating, in response to the selection, to a context within the business application corresponding to the selected event.

21. The non-transitory computer readable medium of claim 20, wherein the notification is directed to the user.

22. The non-transitory computer readable medium of claim 20, wherein the set of one or more events comprises multiple events.

23. The non-transitory computer readable medium of claim 20, wherein instructions for modifying the visual appearance of the menu item within then menu comprises instructions for providing, in the menu, an indication of a number of events for which notification was received.

24. The non-transitory computer readable medium of claim 20, wherein at least one of the set of one or more events is generated by the business application.

25. The non-transitory computer readable medium of claim 20, wherein the business application supports a workflow comprising a plurality of tasks, and wherein at least one of the set of one or more events comprises completion, by a second user, of one of the plurality of tasks.

26. The non-transitory computer readable medium of claim 25, wherein the function corresponds to the workflow, and wherein navigating to a context within the business application comprises navigating to a screen corresponding to a second of the plurality of tasks in the workflow.

27. The non-transitory computer readable medium of claim 20, wherein at least one of the set of one or more events comprises modification of a set of data in a database maintained by the business application.

28. The non-transitory computer readable medium of claim 20, wherein at least one of the set of one or more events corresponds to a timer within the business application.

29. The non-transitory computer readable medium of claim 20, wherein the element is operable to expand a tree view comprising the menu hierarchy with the set of one or more events.

30. The non-transitory computer readable medium of claim 29, wherein the tree view comprises a set of one or more hyperlinks corresponding to the set of one or more events.

31. The non-transitory computer readable medium of claim 30, wherein receiving a selection of an event comprises the user selecting one of the one or more hyperlinks.

32. The non-transitory computer readable medium of claim 20, wherein the menu is displayed on a web page.

33. The non-transitory computer readable medium of claim 20, the set of instructions further comprising:

instructions for receiving, at the business application, notification of a second set of one or more events instructions for identifying, at the computer system, a second function of the business application to which the second set of one or more events pertain;

instructions for identifying a second menu item corresponding to the second function; and instructions for modifying a display property of the second menu item to provide an indication of the second set of one or more events.

34. A computer system comprising:

one or more hardware processors; and a non-transitory computer readable medium in communication with the one or more processors, the computer readable medium having stored thereon a set of instructions executable by the one or more processors that configure the processor to:

receive information providing notification of a set of one or more events;

identify a menu item of a menu to which the set of one or more events pertain, the menu item corresponding to a function of a business application;

determining that a user should be notified of the set of one or more events based at least in part on consulting a set of business rules that comprises a first set of one or more business rules that specify notification based at least in part on a change in value of a key performance indicator, wherein at least one of the set of one or more events pertains to the key performance indicator;

in response to the determining, modify a visual appearance of the menu item within the menu to provide an indication of receiving the set of one or more events based at least in part on a level of urgency associated with the set of one or more events, wherein the modifying comprises: using an element that displays the set of one or more events;

modify a menu hierarchy of the menu item of the menu to include another menu item in the menu hierarchy for each event in the set of one or more events;

receive, input from the user of the business application, indicative of a selection of an event from the set of one or more events displayed in the modified menu hierarchy; and navigate, in response to the selection, to a context within the business application corresponding to the selected event.

35. The computer system of claim 34, wherein the computer system is in communication with a web server, wherein the processor is further configured to:

generate a web page comprising the menu and instructions for transmitting, via the web server, the web page for reception by a web browser operated by the user;

the instructions for receiving input from the user comprise receiving input from the web browser via the web server;

the instructions for receiving a selection of an event comprise instructions for receiving the selection from the web browser via the web server; and the instructions for navigating to a context within the business application comprise instructions for generating a second web page corresponding to the context within the business application and instructions for transmitting, via the web server, the second web page for reception by the web browser.

36. The computer system of claim 35, wherein the computer system comprises the web server.

37. A computer system comprising:

one or more hardware processors; and one or more non-transitory memories storing a business application configured to be executable by the one or more processors, the business application comprising a navigation system comprising a menu configured to display a plurality of interface elements each selectable as menu items to access a corresponding function of the business application, the navigation system being configured to:

receive information providing notification of an event;

identify a function of the business application to which the event pertains;

identify a menu item corresponding to the identified function;

determine that a user should be notified of the event based at least in part on consulting a set of business rules that comprises a first set of one or more business rules that specify notification based at least in part on a change in value of a key performance indicator, wherein the event pertains to the key performance indicator;

in response to the determining, modify the menu for the user based at least in part on a level of urgency associated with the event, wherein the modified menu comprises the menu item, an indication of the event, and an element that displays another menu item for the event relative to the menu item in a menu hierarchy;

receive, from the user, a selection of the event via the menu item; and navigate, in response to the selection, to a context within the business application corresponding to the event.

* * * * *

UNITED STATES PATENT AND TRADEMARK OFFICE
CERTIFICATE OF CORRECTION

PATENT NO. : 9,442,620 B2
APPLICATION NO. : 11/842600
DATED : September 13, 2016
INVENTOR(S) : King et al.

Page 1 of 1

It is certified that error appears in the above-identified patent and that said Letters Patent is hereby corrected as shown below:

In the Specification

In Column 2, Line 45, delete "an/or" and insert -- and/or --, therefor.

In Column 5, Line 21, delete "and or" and insert -- and/or --, therefor.

In Column 7, Line 19, delete "and or" and insert -- and/or --, therefor.

In Column 10, Line 65, delete "flash-updateablc" and insert -- flash-updateable --, therefor.

In Column 11, Line 3, delete "BluetoothlM" and insert -- BluetoothTM --, therefor.

In the Claims

In Column 15, Line 55, in Claim 4, delete "then" and insert -- the --, therefor.

In Column 17, Line 2, in Claim 20, before "the" delete "in".

In Column 17, Line 24, in Claim 23, delete "then" and insert -- the --, therefor.

In Column 18, Line 31, in Claim 34, delete "comprises:" and insert -- comprises --, therefor.

Signed and Sealed this
Sixteenth Day of May, 2017

Michelle K. Lee
*Director of the United States Patent and Trademark Office*